(12) United States Patent
Coca et al.

(10) Patent No.: US 6,336,966 B1
(45) Date of Patent: Jan. 8, 2002

(54) PIGMENT DISPERSIONS CONTAINING DISPERSANTS HAVING CORE AND ARM STAR ARCHITECTURE PREPARED BY CONTROLLED RADICAL POLYMERIZATION

(75) Inventors: Simion Coca, Pittsburgh; James B. O'Dwyer, Valencia, both of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/464,948

(22) Filed: Dec. 16, 1999

(51) Int. Cl.⁷ .................. C08F 291/00; C09D 17/00
(52) U.S. Cl. .................. 106/499; 106/402; 106/408; 106/410; 106/415; 106/436; 106/447; 106/448; 106/456; 106/460; 106/471; 106/472; 106/476; 106/493; 106/494; 106/495; 106/496; 106/497; 106/498; 524/533
(58) Field of Search .................. 106/415, 425, 106/436, 447, 448, 450, 456, 460, 471, 472, 476, 493, 494, 402, 408, 410, 461, 495, 496, 497, 498, 499; 524/533

(56) References Cited

U.S. PATENT DOCUMENTS

| | | | |
|---|---|---|---|
| 4,417,034 A | * 11/1983 | Webster | 526/190 |
| 4,508,880 A | 4/1985 | Webster | 526/190 |
| 4,656,226 A | 4/1987 | Hutchins et al. | 525/93 |
| 4,695,607 A | 9/1987 | Spinelli | 525/272 |
| 4,755,563 A | 7/1988 | West | 525/287 |
| 4,794,144 A | 12/1988 | Spinelli | 525/284 |
| 4,810,756 A | 3/1989 | Spinelli | 525/293 |
| 4,812,517 A | 3/1989 | West | 525/94 |
| 4,847,328 A | 7/1989 | Hutchins et al. | 525/107 |
| 5,032,647 A | 7/1991 | Spinelli | 525/326.5 |
| 5,085,698 A | 2/1992 | Ma et al. | 106/20 |
| 5,219,945 A | 6/1993 | Dicker et al. | 525/276 |
| 5,221,334 A | 6/1993 | Ma et al. | 106/20 D |
| 5,272,201 A | 12/1993 | Ma et al. | 524/505 |
| 5,478,886 A | 12/1995 | Kim | 525/94 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,859,113 A | 1/1999 | McIntyre et al. | 524/460 |

FOREIGN PATENT DOCUMENTS

| | | |
|---|---|---|
| WO | WO 96/30421 | 10/1996 |
| WO | WO 97/18247 | 5/1997 |
| WO | WO 98/01480 | 1/1998 |
| WO | WO 98/40415 | 9/1998 |

OTHER PUBLICATIONS

Macromolecules 1999, 32, 4482–4484 (no month).

* cited by examiner

*Primary Examiner*—Anthony Green
(74) *Attorney, Agent, or Firm*—William J. Uhl; James R. Franks

(57) ABSTRACT

A pigment dispersion comprising pigment, an aqueous carrier selected from water and a mixture of water and at least one organic solvent, and a pigment dispersant is described. The pigment dispersant has core and arm star-type architecture, and is prepared by controlled radical polymerization, e.g., atom transfer radical polymerization, using (i) arm-core, (ii) arm-core-arm, (iii) core-arm, or (iv) concurrent core and arm methods. The arms of the pigment dispersant each have hydrophobic and hydrophilic polymeric chain segments.

26 Claims, 4 Drawing Sheets

PIGMENT DISPERSIONS CONTAINING DISPERSANTS HAVING CORE AND ARM STAR ARCHITECTURE PREPARED BY CONTROLLED RADICAL POLYMERIZATION

FIELD OF THE INVENTION

The present invention relates to pigment dispersions containing pigment, an aqueous carrier, and a pigment dispersant. The pigment dispersant is prepared by controlled radical polymerization, and has star-type architecture in which arm segments extend out from a core segment. Each arm of the pigment dispersant has hydrophobic and hydrophilic polymeric chain segments.

BACKGROUND OF THE INVENTION

Pigmented coating compositions are used in a wide variety of applications including, for example, corrosion resistant primers and decorative topcoats in the automotive, industrial and appliance markets. The preparation of pigmented coating compositions generally involves mixing binder resin(s), crosslinker(s), additives, e.g., flow additives, and solvents with a compatible pigment dispersion. Pigment dispersions are typically prepared by mixing dry pigment with a pigment dispersant in the presence of a carrier medium, e.g., an aqueous carrier medium.

Dry pigments are available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process the pigment agglomerates are broken down into smaller agglomerates and/or individual particles the surfaces of which are wetted by the pigment dispersant. The pigment dispersant suspends or disperses the pigment particles in the carrier medium and prevents their re-agglomeration on storage. It is desirable that the pigment dispersion remain substantially stable, e.g., showing minimal pigment settling and viscosity change with time, prior to its use in the preparation of a pigmented coating composition.

Reducing the environmental impact of pigmented coatings compositions, in particular that associated with emissions into the air of volatile organics during their use, has been an area of ongoing investigation and development in recent years. Accordingly, interest in aqueous pigment dispersions has been increasing due, in part, to the inherently low volatile organic content (VOC) of the aqueous pigmented coatings prepared therefrom, which can significantly reduce air emissions during the application process.

Pigment dispersants used in aqueous pigment dispersions are preferably compatible with both the aqueous carrier medium and the hydrophobic surfaces of the pigment particles. Such a combination of disparate properties can be achieved with a pigment dispersant having distinct hydrophobic and hydrophilic polymeric segments or portions, i.e., having well defined polymer chain architecture. A wide variety of radically polymerizable monomers, such as methacrylate and acrylate monomers, are commercially available and can provide a wide range of properties including, for example, hydrophilic and hydrophobic properties. The use of conventional, i.e., non-living or free, radical polymerization methods to synthesize pigment dispersants provides little control over molecular weight, molecular weight distribution and, in particular, polymer chain structure. Aqueous pigment dispersions containing pigment dispersants prepared by conventional non-living radical polymerizations, typically have poor stability, e.g., the pigments re-agglomerate and/or settle out of the dispersion, and are unsuitable for the preparation of aqueous pigmented coatings compositions.

The continued development of aqueous pigment dispersions that are stable and suitable for the preparation of aqueous pigmented coating compositions is desirable. In particular, it would be desirable to develop aqueous pigment dispersions that comprise pigment dispersants having well defined polymer chain architecture in which distinct hydrophilic and hydrophobic polymer segments or portions are present.

U.S. Pat. Nos. 5,807,937, 5,789,487 and 5,763,548, and International Patent Publication No.'s WO 98/40415, WO 98/01480, WO 97/18247 and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

SUMMARY OF THE INVENTION

In accordance with the present invention, there is provided a pigment dispersion comprising:
(a) pigment;
(b) an aqueous carrier selected from water and a mixture of water and at least one organic solvent; and
(c) at least one pigment dispersant prepared by controlled radical polymerization of a polymerizable composition selected from,
  (i) a prepolymer having a radically transferable group, and a polyfunctional monomer having at least two radically polymerizable ethylenically unsaturated groups, said prepolymer being prepared by controlled radical polymerization of at least one first monomer having a single radically polymerizable ethylenically unsaturated group in the presence of a monomeric initiator having at least one radically transferable group;
  (ii) a star polymer having a plurality of radically transferable groups, and at least one second monomer having a single radically polymerizable ethylenically unsaturated group, said star polymer being prepared by the controlled radical polymerization of said prepolymer and said polyfunctional monomer, said first and second monomers being the same or different;
  (iii) a core initiator having a plurality of radically transferable groups, and said first monomer, said core initiator being prepared by controlled radical polymerization of said polyfunctional monomer in the presence of said monomeric initiator; and
  (iv) said first monomer and said polyfunctional monomer in the presence of said monomeric initiator; wherein upon the controlled radical polymerization of said polymerizable composition, said polyfunctional monomer or said core initiator forms substantially a core segment of said pigment dispersant, and said prepolymer or at least one of said first and second monomers forms substantially a plurality of arm segments of said pigment dispersant, each of said arm segments having hydrophobic and hydrophilic polymer chain segments.

The features that characterize the present invention are pointed out with particularity in the claims which are annexed to and form a part of this disclosure. These and other features of the invention, its operating advantages and the specific objects obtained by its use will be more fully understood from the following detailed description and the accompanying drawings in which pigment dispersants useful in embodiments of the invention are illustrated and described.

Other than in the operating examples, or where otherwise indicated, all numbers or expressions referring to quantities of ingredients, reaction conditions, etc, used in the specification and claims are to be understood as modified in all instances by the term "about."

BRIEF DESCRIPTION OF THE DRAWINGS

In FIGS. 1 through 4, like reference numerals represent the same structural segments.

DETAILED DESCRIPTION OF THE INVENTION

Figure 1:
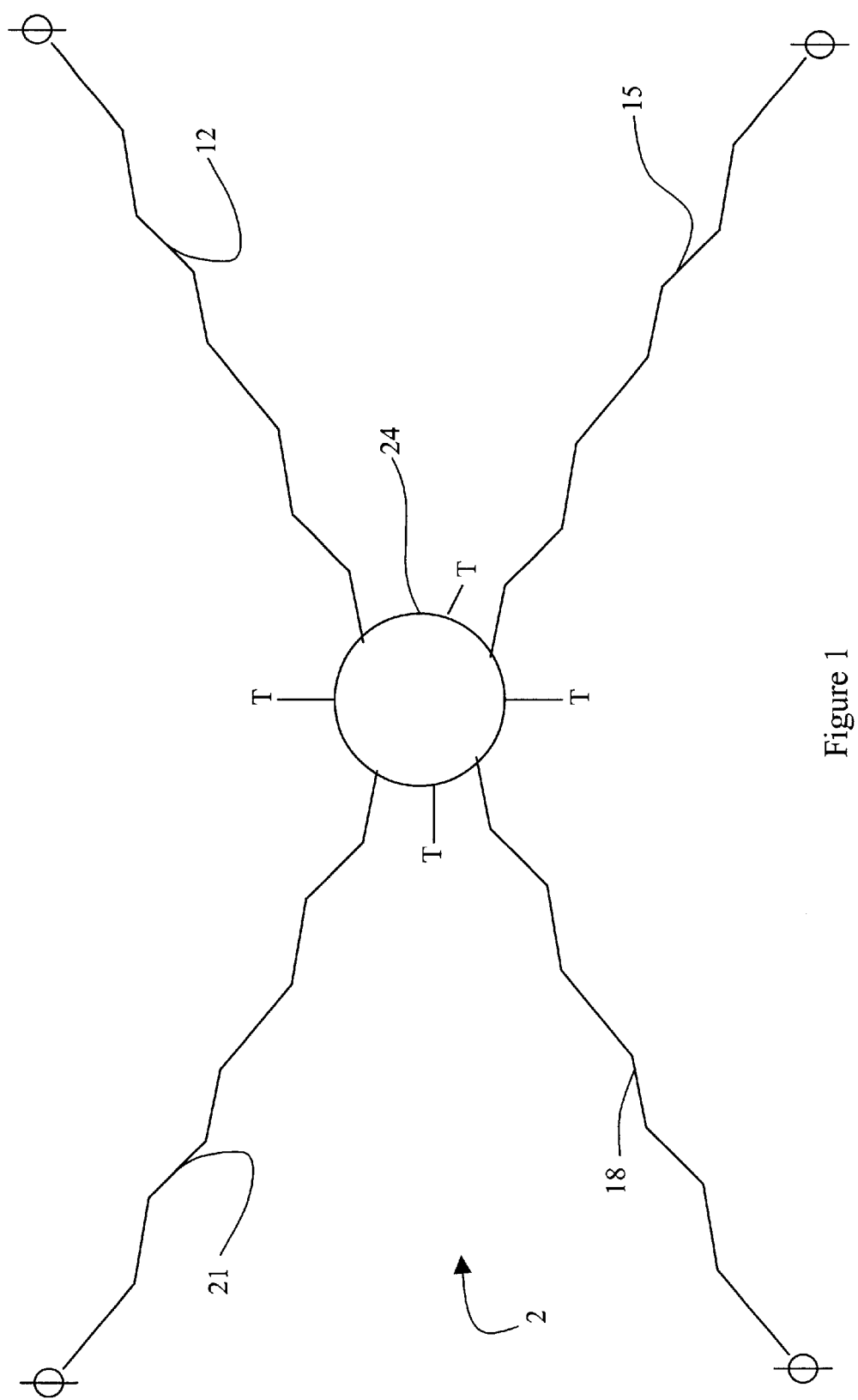
FIG. 1 is a diagrammatic representation of a pigment dispersant useful in the pigment dispersions of the present invention, in which the arms are prepared before the core.

Pigment dispersions according to the present invention comprise one or more pigment dispersants which can be described generally as having a star-like architecture, in which polymeric arm segments extend out from a polymeric core segment. Each of the polymeric arm segments has hydrophilic and hydrophobic polymeric chain segments. The hydrophobic polymeric chain segments of the arms may be located either closer to the core or at the terminal portion of the arms furthest from the core, the hydrophilic polymeric chain segments being alternatively located. While not intending to be bound by any theory, it is believed that the hydrophilic segments of the arms of the pigment dispersant are associated with the aqueous carrier, while the hydrophobic segments of the arms are associated with the pigment of the pigment dispersion.

As used herein and in the claims, the terms "hydrophobic" and "hydrophilic" are relative to each other. Within an arm of the pigment dispersant, the hydrophobic segment is more hydrophobic than the hydrophilic segment. Correspondingly, within an arm of the pigment dispersant, the hydrophilic segment is more hydrophilic than the hydrophobic segment.

A more quantitative measure of the hydrophobic or hydrophilic nature of a nonionic monomer residue can be obtained by using the following Formula-A: 100×(oxygen weight+nitrogen weight)/(carbon weight). Monomer residues having calculated Formula-A values of greater magnitude are generally considered to be more hydrophilic than monomer residues having calculated Formula-A values of lesser magnitude. For example, the calculated Formula-A value is 67 for 2-hydroxyethyl methacrylate; 63 for methacrylamide; 53 for methyl methacrylate; 33 for butyl methacrylate; and 22 for 2-ethylhexyl methacrylate. Accordingly, an average Formula-A value can be calculated for a polymer chain segment by averaging the calculated Formula-A values for the monomer residues within that segment.

In an embodiment of the present invention, within an arm segment of the pigment dispersant, the hydrophilic polymer chain segment has a calculated average Formula-A value of from 55 to 133, while the hydrophobic polymer chain segment has a calculated average Formula-A value of from 10 to less than 55, e.g., from 10 to 40 or from 10 to 33. Within an arm segment of the pigment dispersant, the difference between the calculated Formula-A values of the hydrophilic polymer chain segment and hydrophobic polymer chain segment is typically at least 10, e.g., at least 25, and typically within the range of 10 to 40, inclusive of the recited values.

The hydrophobic polymer chain segment within an arm of the pigment dispersant typically does not contain ionic monomer residues. The hydrophilic polymer chain segment within an arm of the pigment dispersant may contain ionic monomer residues, nonionic monomer residues (e.g., having calculated Formula-A values of from 55 to 133) or a combination of ionic and nonionic monomer residues.

The pigment dispersant is prepared by controlled radical polymerization. As used herein and in the claims, the term "controlled radical polymerization," and related terms, e.g., "living radical polymerization," refer to those methods of radical polymerization that provide control over the polymer chain architecture of the resulting polymer, and optionally provide control over the molecular weight and polydispersity of the resulting polymer or prepolymers used in the preparation of the final polymer product. A controlled or living radical polymerization is also described as a chain-growth polymerization that propagates with essentially no chain transfer and essentially no chain termination. The number of living polymer chains formed during a controlled radical polymerization is often nearly equal to the number of radically transferable groups present at the beginning of the reaction (a multiple of the initial number of initiators and the number of radically transferable groups per initiator). Each living polymer chain typically contains a residue of the initiator at what is commonly referred to as its tail, and a residue of the radically transferable group at what is commonly referred to as its head.

In a preferred embodiment of the present invention, the pigment dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In the present invention, the initiation system comprises: a monomeric initiator having at least one radically transferable atom or group; a transition metal compound, i.e., a catalyst, which participates in a reversible redox cycle with the initiator; and a ligand, which coordinates with the transition metal compound. The ATRP process is described in further detail in international patent publication WO 98/40415 and U.S. Pat. Nos. 5,807,937, 5,763,548 and 5,789,487.

Catalysts that may be used in the ATRP preparation of the pigment dispersant, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula I, $$TM^{n+}X_n \qquad \qquad I$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)Cl$_2$ when Cu(I)Cl is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the pigment dispersant, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. As used herein and in the claims, the term "(meth)acrylate" and similar terms refer to acrylates, methacrylates, and mixtures of acrylates and methacrylates. A preferred class of ligands are the substituted bipyridines, e.g., 4,4'-dialkylbipyridyls. Additional ligands that may be used in preparing pigment dispersant are described in U.S. Pat. No. 5,807,937 at column 18, line 57 through column 21, line 43.

Classes of monomeric initiators that may be used in the ATRP preparation of the pigment dispersant include, but are not limited to aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having at least one radically transferable group. The radically transferable group(s) of the monomeric initiator may be selected from, for example, cyano, cyanato, thiocyanato, azido, halide groups and combinations thereof. Preferably, the radically transferable group of the monomeric initiator is selected from halide groups, e.g., chloride, bromide and iodide. The monomeric initiator may also be substituted with functional groups, e.g., oxyranyl groups, such as glycidyl groups. As used herein and in the claims, the term "monomeric initiator" is meant to be distinguishable from polymeric initiators, such as polyethers, polyurethanes, polyesters and acrylic polymers having radically transferable groups. Additional useful initiators are described in U.S. Pat. No. 5,807,937 at column 17, line 4 through column 18, line 28.

In an embodiment of the present invention, the monomeric initiator has a single radically transferable group, which is a halide group. Examples of monomeric initiators having a single radically transferable halide group that may be used to prepare the pigment dispersant include, but are not limited to, 1-halo-2,3-epoxypropane, p-toluenesulfonyl halide, p-toluenesulfenyl halide, $C_6$–$C_{20}$-alkyl ester of alpha-halo-$C_2$–$C_6$-carboxylic acid, halomethylbenzene, (1-haloethyl)benzene, halomethylnaphthalene, halomethylanthracene and mixtures thereof.

In another embodiment of the present invention, the monomeric initiator has two or more radically transferable groups, which are selected from halides. Examples of monomeric initiators having two or more radically transferable halide groups that may be used to prepare the pigment dispersant include, but are not limited to, methylenedihalide, e.g., methylenedichloride and methylenedibromide; haloform, e.g., chloroform; carbon tetrahalide, e.g., carbon tetrachloride; di through hexakis(($\alpha$-halo-$C_1$–$C_6$-alkyl) benzene, e.g., di(chloromethyl)benzene, di(1-chloroethyl) benzene, tetrakis(chloromethyl)benzene, tetrakis (bromomethyl)benzene and hexakis(chloromethyl)benzene; and 2,2-bis(halomethyl)-1,3-dihalopropane, e.g., 2,2-bis (chloromethyl)-1,3-dichloropropane and 2,2-bis (bromomethyl)-1,3-dibromopropane; $C_1$–C6 linear or branched alkyl ester of alpha-polyhalo (i.e., dihalo and trihalo) $C_2$–$C_6$ carboxylic acid, e.g., methyl dichloroacetate and methyl trichloroacetate; and mixtures thereof. A mixture of monomeric initiators having a single radically transferable group and two or more radically transferable groups may be used to prepare the pigment dispersant.

Monomeric initiators having two or more radically transferable groups may also be selected from one or more initiators represented by the following general formula II,

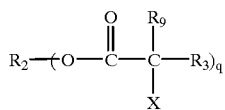

II

In general formula II, $R_2$ is the residue of a polyol having from 2 to 10 hydroxy groups; X is halide; $R_3$ and $R_9$ are each independently selected from hydrogen, $C_1$–$C_{20}$ linear or branched alkyl groups, e.g., methyl, ethyl, propyl, butyl, hexyl, octyl, nonyl, decyl, dodecyl and icosanyl, aryl groups, e.g., phenyl, and polycyclic aromatic groups, e.g., naphthalenyl and anthracenyl; and q is a number from 2 to the number of hydroxy groups of the polyol, e.g., 2, 3, 4, 5, 6, 7, 8, 9 or 10. The monomeric initiator may be selected from mixtures of initiators represented by general formula II and those initiators recited previously herein.

In an embodiment of the present invention, the polyol of which $R_2$ is a residue in general formula II, may be selected from alkylene glycol, e.g., ethylene glycol, propylene glycol, butylene glycol and pentylene glycol; di through penta(alkylene glycols), e.g., di-, tri-, tetra- and penta (ethylene glycols) and di through penta(propylene glycols); trimethylolpropane; trimethylolethane; di-trimethylolpropane; di-trimethylolethane; pentaerythritol; di-pentaerythritol; and mixtures thereof. With further reference to general formula II, $R_3$ and $R_9$ are each preferably and independently selected from hydrogen and a $C_1$–$C_4$ alkyl group, and X is chlorine or bromine.

In the ATRP preparation the pigment dispersant, the amounts and relative proportions of monomeric initiator, transition metal compound and ligand are those for which ATRP is most effectively performed. The amount of monomeric initiator used can vary widely and is typically present in the reaction medium in a concentration of from $10^{-4}$ moles/liter (M) to 3 M, for example, from $10^{-3}$ M to $10^{-1}$ M. As the molecular weight of, for example, prepolymers used in the preparation of the pigment dispersant can be directly related to the relative concentrations of monomeric initiator and monomer(s), the molar ratio of monomeric initiator to monomer is an important factor in polymer preparation. The molar ratio of monomeric initiator to monomer is typically within the range of $10^{-4}:1$ to $0.5:1$, for example, $10^{-3}:1$ to $5 \times 10^{-2}:1$.

In preparing the pigment dispersant by ATRP methods, the molar ratio of transition metal compound to monomeric initiator is typically in the range of $10^{-4}:1$ to $10:1$, for example, $0.1:1$ to $5:1$. The molar ratio of ligand to transition metal compound is typically within the range of $0.1:1$ to $100:1$, for example, $0.2:1$ to $10:1$.

The pigment dispersant may be prepared in the absence of solvent, i.e., by means of a bulk polymerization process. Generally, the pigment dispersant is prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitriles, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the pigment dispersant is typically conducted at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

The ATRP transition metal catalyst and its associated ligand are typically separated or removed from the pigment dispersant prior to its use in the pigment dispersions of the present invention. Removal of the ATRP catalyst may be achieved using known methods, including, for example, adding a catalyst binding agent to a mixture of the pigment dispersant, solvent and catalyst, followed by filtering. Examples of suitable catalyst binding agents include, for example, alumina, silica, clay or a combination thereof. A mixture of the pigment dispersant, solvent and ATRP catalyst may be passed through a bed of catalyst binding agent. Alternatively, the ATRP catalyst may be oxidized in situ, the oxidized residue of the catalyst being retained in the pigment dispersant.

The pigment dispersant can be prepared by the controlled radical polymerization of polymerizable compositions (c)(i) through (c)(iv), as described previously herein. When polymerizable composition (c)(i) is used, the pigment dispersant can be described as being prepared by an arm-core method. In the arm-core method, the arm segments (i.e., the prepolymer having a radically transferable group) are prepared first from the controlled radical polymerization of at least one first monomer in the presence of a monomeric initiator having at least one radically transferable group. The monomeric initiator may be selected from those as recited and described previously herein. The core segment is then formed subsequently from the controlled radical polymerization of the prepolymer and a polyfunctional monomer. Accordingly, the polyfunctional monomer forms substantially the core segment, and the prepolymer forms substantially the arm segments of the pigment dispersant when composition (c)(i) is used. A polymer prepared by an arm-core method can be referred to as an arm-core polymer.

Polyfunctional monomers that may be used in the preparation of the pigment dispersant have at least two radically polymerizable ethylenically unsaturated groups, e.g., vinyl groups. The polyfunctional monomer may be selected from, for example, vinyl aromatic monomers, such as divinyl benzene, diisopropenyl benzene, trivinyl benzene, divinyl naphthalene and mixtures thereof. In a preferred embodiment of the present invention, the radically polymerizable ethylenically unsaturated groups of the polyfunctional monomer are (meth)acryloyl groups, and the polyfunctional monomer is represented by the following general formula III,

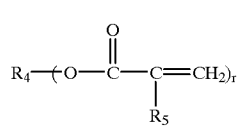

In general formula III, $R_4$ is a residue of a polyol having at least two hydroxyl groups, e.g., having from 2 to 10 hydroxy groups; $R_5$ is hydrogen or methyl; and r is a number from 2 to a number equal to the number of hydroxy groups of said polyol, e.g., 2, 3, 4, 5, 6, 7, 8, 9 or 10. The polyol of which $R_4$ is a residue, may be selected from those polyols as recited previously herein with reference to general formula II. In an embodiment of the present invention, $R_4$ is a residue of a polyol selected from alkylene glycol, e.g., ethylene glycol, propylene glycol, butylene glycol and pentylene glycol; poly(alkylene glycol), e.g., poly(ethylene glycol) having a number average molecular weight of from 500 to 20,000; 4,4'-isopropylidenediphenol, trimethylol ethane, trimethylol propane, pentaerythritol, di-trimethylol ethane, di-trimethylol propane, di-pentaerythritol and mixtures thereof.

A conceptualization of a pigment dispersant that is prepared by the arm-core method from polymerizable composition (c)(i), in which the monomeric initiator has a single radically transferable group, is represented diagrammatically in FIG. 1 of the drawings. Pigment dispersant 2 of FIG. 1 has arm segments 12, 15, 18 and 21, which may be the same or different, and a core segment 24. Arm segments 12, 15, 18 and 21 are residues of the prepolymer(s) used to prepare pigment dispersant 2, and each contains a residue of the monomeric initiator, represented by the symbol φ. The core 24 of pigment dispersant 2 has residues of or derived from the radically transferable group of the monomeric initiator bonded thereto, as represented by the letter T.

When polymerizable composition (c)(ii) is used, the pigment dispersant can be described as being prepared by an arm-core-arm method. In the arm-core-arm method, an arm-core star polymer is first prepared from, for example, composition (c)(i). The arm-core star polymer, which has a plurality of radically transferable groups bonded primarily to its core, is then further polymerized, under conditions of controlled radical polymerization, with at least one second monomer. The second monomer forms additional arms that grow out from the core of the arm-core star polymer. The polyfunctional monomer forms substantially the core segment, and both the prepolymer and second monomer form substantially the arm segments of the pigment dispersant when polymerizable composition (c)(ii) is used.

Figure 2:
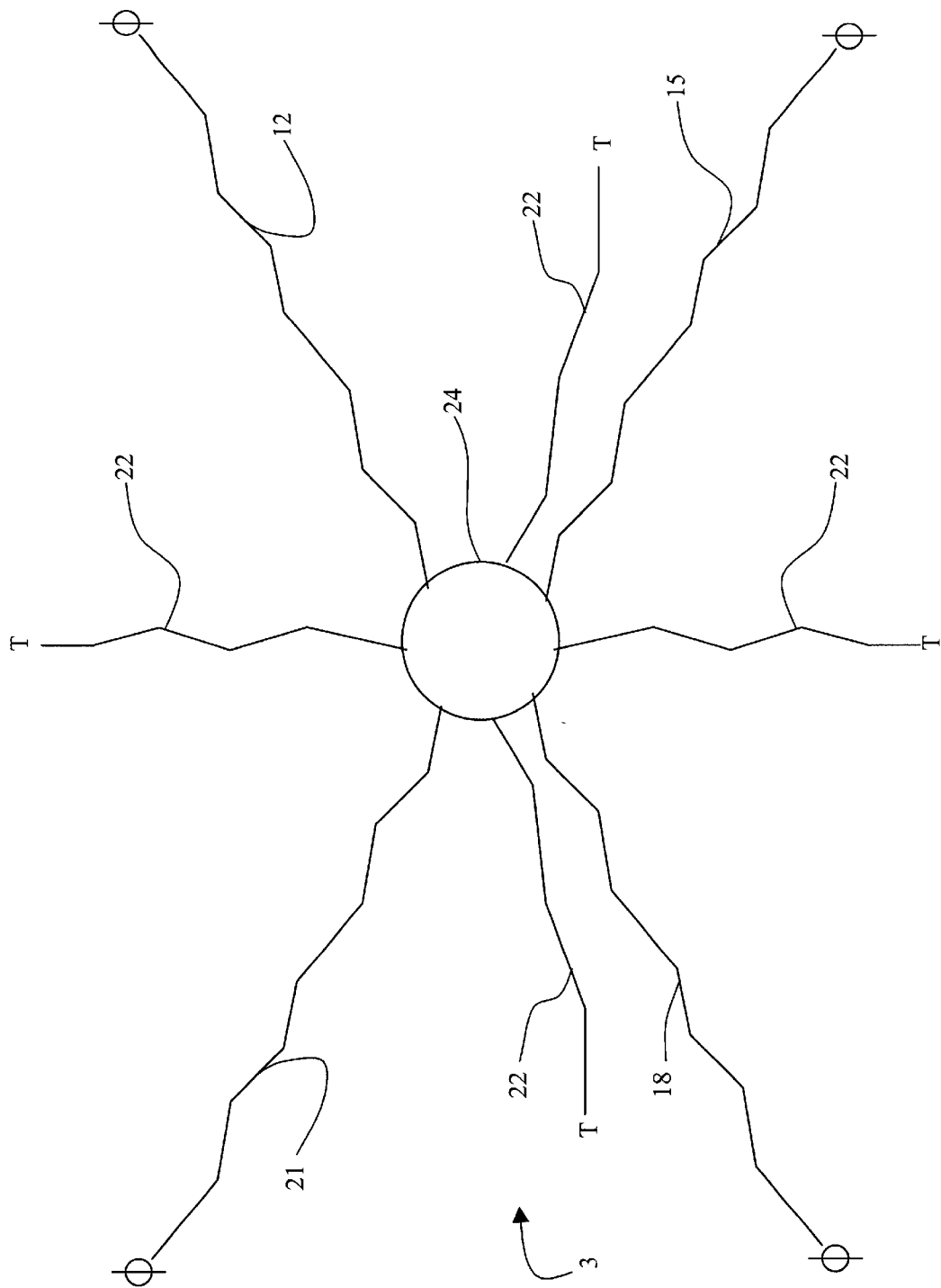
FIG. 2 is a diagrammatic representation of a pigment dispersant similar that of FIG. 1, in which additional arms are grown out from the core.

A conceptualization of a pigment dispersant prepared by the arm-core-arm method from polymerizable composition (c)(ii), in which the monomeric initiator has a single radically transferable group, is represented diagrammatically in FIG. 2 of the drawings. Pigment dispersant 3 of FIG. 2 is prepared by further polymerizing pigment dispersant 2 of FIG. 1, which can be used as the arm-core star polymer, with at least one second monomer. Polymerization with the second monomer results in the formation of arms 22, which grow out from core 24. Each of arm segments 22 has a residue of or derived from the radically transferable group of the monomeric initiator bonded thereto, as represented by the letter T.

The pigment dispersant may be prepared from polymerizable composition (c)(iii), in which case the core is prepared first in the form of a core initiator, and the arms are subsequently grown out from the core initiator, i.e., a core-arm method of preparation. The controlled radical polymerization of a polyfunctional monomer in the presence of a monomeric initiator (both of which may be selected from those examples as recited and described previously herein) results in the formation of a core initiator having a plurality of radically transferable groups. Under conditions of controlled radical polymerization, the core initiator is then polymerized with the first monomer. The core initiator forms substantially the core segment, and the first monomer forms substantially the arm segments of the pigment dispersant when polymerizable composition (c)(iii) is used.

Figure 3:
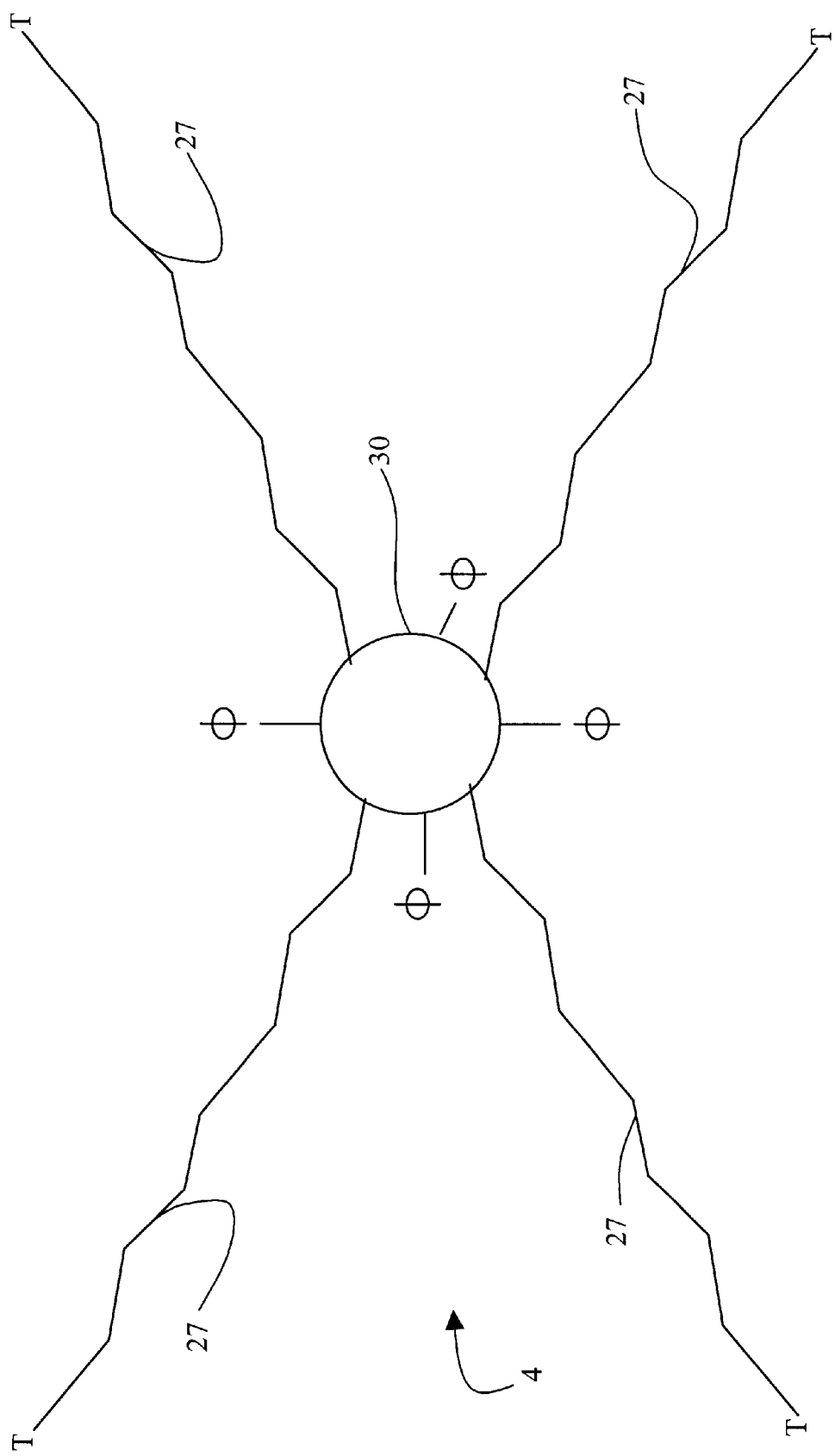
FIG. 3 is a diagrammatic representation of a pigment dispersant useful in the pigment dispersions of the present invention, in which the core is prepared before the arms.

In FIG. 3 of the drawings, there is represented a conceptualization of a pigment dispersant prepared by the core-arm method from polymerizable composition (c)(iii), in which the monomeric initiator has a single radically transferable group. Pigment dispersant 4 of FIG. 3 has a core segment 30, which is a residue of the core initiator prepared from the polymerization of a polyfunctional monomer and a monomeric initiator. Polymerization of the core initiator with the first monomer results in the formation of arm segments 27, which grow out from the core. Core segment 30 has residues of the monomeric initiator bonded thereto, represented by the symbol φ. Each arm segment 27 has a residue of or derived from the radically transferable group of the monomeric initiator bonded thereto, represented by the letter T.

The pigment dispersant may be prepared from polymerizable composition (c)(iv), in which case the core segment and arm segments are formed at the same time, i.e., a concurrent core and arm method. In the concurrent core and arm method, the first monomer and the polyfunctional monomer are both polymerized together, under conditions of controlled radical polymerization in the presence of a monomeric initiator. The polyfunctional monomer forms substantially the core segment, and the first monomer forms substantially the arm segments of the pigment dispersant when polymerizable composition (c)(iv) is used.

Figure 4:
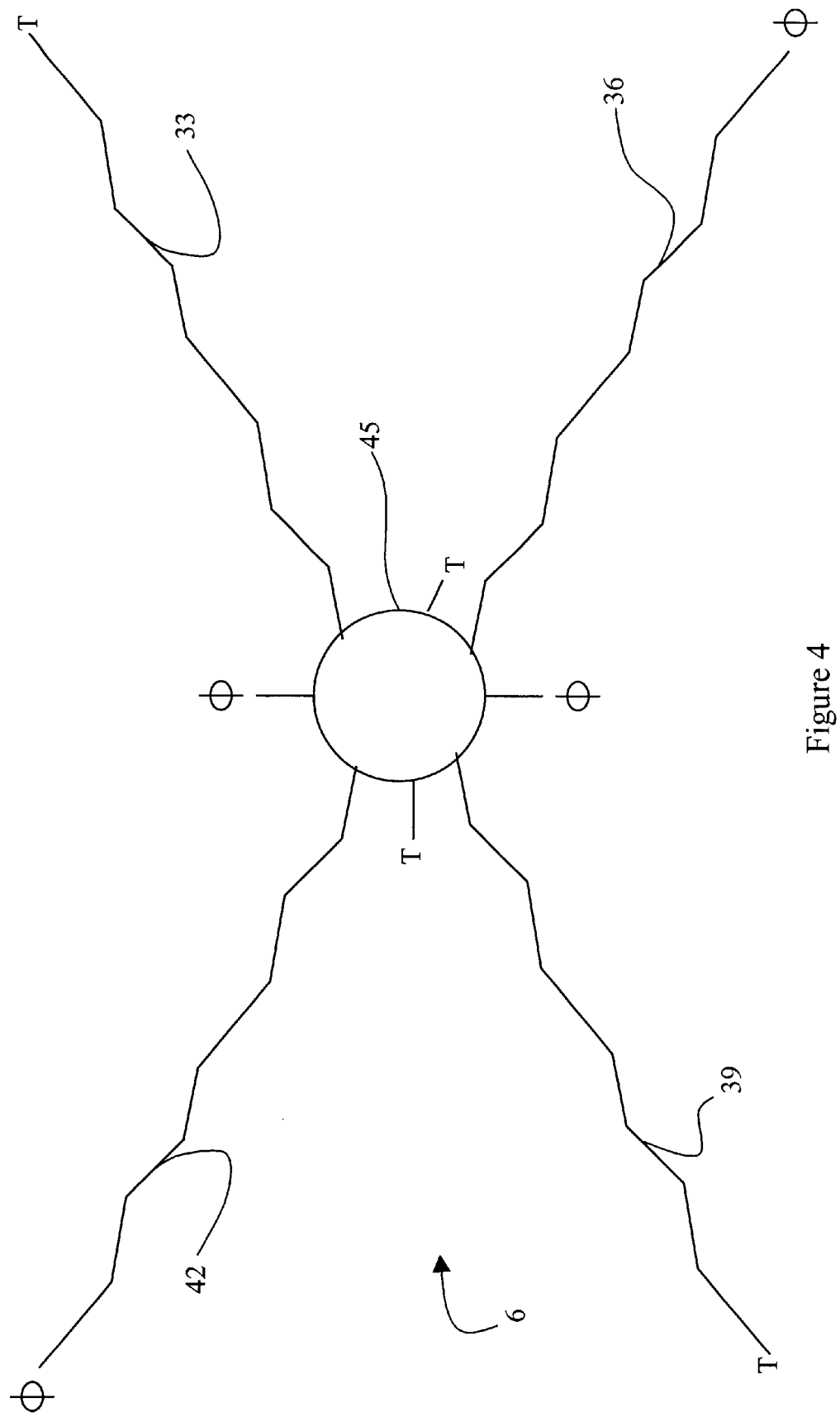
FIG. 4 is a diagrammatic representation of pigment dispersant useful in the pigment dispersions of the present invention, in which the core and arms are concurrently prepared.

In FIG. 4 of the drawings, there is represented a conceptualization of a pigment dispersant prepared by the concurrent core and arm method from polymerizable composition (c)(iv), in which the monomeric initiator has a single radically transferable group. Pigment dispersant 6 of FIG. 4 has arm segments 33, 36, 39 and 42, which may be the same or different, and a core segment 45. Arm segments 33 and 39 have a residue of the monomeric initiator bonded thereto, represented by the symbol φ. Arm segments 36 and 42 have a residue of or derived from the radically transferable group of the monomeric initiator bonded thereto, represented by the letter T. Core segment 45 of pigment dispersant 6 has both residues of the monomeric initiator and residues of or derived from the radically transferable group of the monomeric initiator bonded thereto.

For ease of illustration, cores 24, 30 and 45 of pigment dispersants 2, 3, 4 and 6 of FIGS. 1–4 are represented as circles. However, while not intending to be bound by any theory, it is believed that cores 24, 30 and 45 each have a much more complicated configuration, such as a crosslinked core having a plurality of looped sections. Further, while the arm segments of each of pigment dispersants 2, 3, 4 and 6 are shown as having substantially the same length, they may have different lengths.

The first and second monomers used to prepare the pigment dispersant, may each be selected independently from vinyl monomers, alylic monomers, olefins and mixtures thereof. Classes of vinyl monomers from which each of the first and second monomers may be independently selected include, but are not limited to, (meth)acrylic acid, (meth)acrylates, (meth)acrylamide, N- and N,N-disubstituted (meth)acrylamides, vinyl aromatic monomers, vinyl halides and vinyl esters of carboxylic acids.

Examples of $C_1$–$C_{20}$ alkyl (meth)acrylates (including linear or branched alkyls and cycloalkyls) from which each of the first and second monomers may be independently selected include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isocane (meth)acrylate. Examples of oxirane functional (meth)acrylates from which each of the first and second monomers may be independently selected include, but are not limited to, glycidyl (meth)acrylate, 3,4-epoxycyclohexylmethyl(meth)acrylate, and 2-(3,4-epoxycyclohexyl)ethyl(meth)acrylate.

Hydroxy alkyl (meth)acrylates having from 2 to 4 carbon atoms in the alkyl group, from which each of the first and second monomers may be independently selected include, but are not limited to, hydroxyethyl (meth)acrylate, hydroxypropyl (meth)acrylate and hydroxybutyl (meth)acrylate.

Specific examples of vinyl aromatic monomers from which each of the first and second monomers may be independently selected include, but are not limited to, styrene, p-chloromethylstyrene and vinyl naphthalene. Vinyl halides from which each of the first and second monomers may be independently selected include, but are not limited to, vinyl chloride and vinylidene fluoride. Vinyl esters of carboxylic acids from which each of the first and second monomers may be independently selected include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins from which each of the first and second monomers may be independently selected include, but are not limited to, propylene, 1-butene and isobutylene.

As used herein and in the claims, by "allylic monomer(s)" is meant monomers containing substituted and/or unsubstituted allylic functionality, i.e., one or more radicals represented by the following general formula IV, $$H_2C=C(R_1)-CH_2- \qquad \qquad IV$$

wherein $R_1$ is hydrogen, halogen or a $C_1$ to $C_4$ alkyl group. Most commonly, $R_1$ is hydrogen or methyl and consequently general formula IV represents the (meth)allyl radical (i.e., the methallyl or allyl radical). Examples of allylic monomers from which each of the first and second monomers may be independently selected include, but are not limited to: (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers from which each of the first and second monomers may be independently selected include, but are not limited to: cyclic anhydrides, e.g., maleic anhydride, 1-cyclopentene-1,2-dicarboxylic anhydride and itaconic anhydride; esters of acids that are unsaturated but do not have $\alpha,\beta$-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

Each of the arm segments of the pigment dispersant have hydrophobic and hydrophilic polymer chain segments. In an embodiment of the present invention, the hyrophobic polymer chain segments of each arm of the pigment dispersant contain residues of a monomer selected from: oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_1$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclic aromatic (meth)acrylates, e.g., 2-naphthyl (meth)acrylate; vinyl esters of carboxylic acids, e.g., hexanoic acid vinyl ester and decanoic acid vinyl ester; N,N-di($C_1$–$C_8$ alkyl) (meth)acrylamides; malcimide; N—($C_1$–$C_{20}$ alkyl) maleimides; N—($C_3$–$C_8$ cycloalkyl) maleimides; N—(aryl) maleimides; and mixtures thereof. Examples of N-substituted maleimides include, but are not limited to, N—($C_1$–$C_{20}$ linear or branched alkyl) maleimides, e.g., N-methyl maleimide, N-tertiary-butyl maleimide, N-octyl maleimide and N-icosane maleimide; N—($C_3$–$C_8$ cycloalkyl) maleimides, e.g., N-cyclohexyl maleimide; and N-(aryl) maleimides, e.g., N-phenyl maleimide, N—($C_1$–$C_9$ linear or branched alkyl substituted phenyl) maleimide, N-benzyl maleimide and N—($C_1$–$C_9$ linear or branched alkyl substituted benzyl) maleimide.

The oxirane functional monomer or its residue that is reacted with a carboxylic acid, may be selected from, for example, glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

The hydrophilic polymer chain segments of each arm of the pigment dispersant may contain residues having non-ionic moieties, ionic moieties and combinations thereof. In an embodiment of the present invention, the hydrophilic polymer chain segments of each arm contain residues of monomers selected from, for example, poly(alkylene glycol) (meth)acrylates; $C_1$–$C_4$ alkoxy poly(alkylene glycol) (meth)acrylates; hydroxyalkyl (meth)acrylates having from 2 to 4 carbon atoms in the alkyl group; N-(hydroxy $C_1$–$C_4$ alkyl) (meth)acrylamides, e.g., N-hydroxymethyl (meth) acrylamide and N-(2-hydroxyethyl) (meth)acrylamide; N,N-di-(hydroxy $C_1$–$C_4$ alkyl) (meth)acrylamides, e.g., N,N-di (2-hydroxyethyl) (meth)acrylamide; carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates that may be present as monomer residues in the hydrophilic polymer chain segments of the pigment dispersant are prepared by known methods. For example, (meth)acrylic acid or hydroxyalkyl (meth)acrylate, e.g., 2-hydroxyethyl (meth)acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of preferred poly(alkylene glycol) (meth) acrylates and $C_1$–$C_4$ alkoxy poly(alkylene glycol) (meth) acrylates include, poly(ethylene glycol) (meth)acrylate and methoxy poly(ethylene glycol) (meth)acrylate, the poly (ethylene glycol) moiety of each having a molecular weight of from 100 to 800. An example of a commercially available $C_1$–$C_4$ alkoxy poly(alkylene glycol) (meth)acrylate is methoxy poly(ethylene glycol) 550 methacrylate monomer from Sartomer Company, Inc.

Examples of carboxylic acid functional monomers that may be present as monomer residues in the hydrophilic polymer chain segments of the arms of the pigment dispersant include, but are not limited to, (meth)acrylic acid, maleic acid, fumeric acid and undecylenic acid. The hydrophilic polymer chain segments of each arm may contain precursors of carboxylic acid functional monomer residues that are converted to carboxylic acid residues after completion of the polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized reactions with water, alcohols or primary amines, respectively. Residues of $C_1$–$C_4$ alkyl (meth) acrylates, such as t-butyl methacrylate, can be converted to (meth)acrylic acid residues by art-recognized ester hydrolyzation methods, which typically involve the concurrent removal of an alcohol, such as t-butanol, by vacuum distillation. Salts of carboxylic acid functional monomers that may be present as monomer residues in the hydrophilic polymer chain segments of the arms include, for example, salts of (meth)acrylic acid and primary, secondary or tertiary amines, such as, butyl amine, dimethyl amine and triethyl amine.

Amine functional monomers that may be present as monomer residues in the hydrophilic polymer chain segments of the arms of the pigment dispersant include, for example, amino($C_2$–$C_4$ alkyl) (meth)acrylates, e.g., 2-aminoethyl (meth)acrylate, 3-aminopropyl (meth)acrylate and 4-aminobutyl (meth)acrylate; N—($C_1$–$C_4$ alkyl)amino ($C_2$–$C_4$ alkyl) (meth)acrylates, e.g., N-methyl-2-aminoethyl (meth)acrylate; and N,N-di($C_1$–$C_4$ alkyl)amino($C_2$–$C_4$ alkyl) (meth)acrylates, e.g., N,N-dimethyl-2-aminoethyl (meth)acrylate. The hydrophilic polymer chain segments of each arm may also comprise residues of salts of amine functional monomers, e.g., salts of those amine functional monomers as recited previously herein. Salts of the amine functional monomer residues may be formed by mixing a carboxylic acid, e.g., lactic acid, with the pigment dispersant after completion of controlled radical polymerization.

In an embodiment of the present invention, the hydrophilic polymer chain segments of each arm contains residues of carboxylic acid functional monomers selected from (meth)acrylic acid, maleic anhydride, maleic acid, di($C_1$–$C_4$ alkyl) maleates, and mixtures thereof. In a still further embodiment of the present invention, the hydrophilic polymer chain segments of each arm contains residues of amine functional monomers selected from amino($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

The hydrophilic polymer chain segments of each arm of the pigment dispersant may also contain cationic moieties selected from ammonium, sulphonium and phosphonium. Ammonium, sulphonium and phosphonium moieties may be introduced into the hydrophilic polymer chain segments of the arms of the pigment dispersant by means known to the skilled artisan. For example, when the arms contain residues of N,N-dimethyl-2-aminoethyl (meth)acrylate, the N,N-dimethylamino moieties may be converted to ammonium moieties by mixing an acid, e.g., lactic acid, with the pigment dispersant.

When the arms of the pigment dispersant contain residues of oxirane functional monomers, such as glycidyl (meth) acrylate, the oxirane groups may be used to introduce sulphonium or phosphonium moieties into the arms. Sulphonium moieties may be introduced into the arms by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the arms of the pigment dispersant.

The prepolymer of polymerizable compositions (c)(i) and (c)(ii) may have polymer chain structure represented by at least one of the following general formulas V and VI,

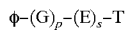        V and

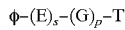        VI

In each of general formulas V and VI, G is a hydrophobic residue of at least one radically polymerizable ethylenically unsaturated monomer, and E is a hydrophilic residue of at least one radically polymerizable ethylenically unsaturated monomer. The prepolymers represented by general formulas V and VI are prepared by atom transfer radical polymerization using a monomeric initiator having a single radically transferable group. With further reference to general formulas V and VI, φ is a residue of or derived from the monomeric initiator, and is free of said radically transferable group; T is the radically transferable group of the monomeric initiator; p and s represent average numbers of residues occurring in a block of residues, and are each individually selected for each structure such that said prepolymer has a number average molecular weight of at least 250.

The prepolymer used in the preparation of the pigment dispersant, typically has a number average molecular weight (Mn) of from 250 to 25,000, e.g., from 1000 to 15,000 or from 2000 to 10,000, as determined by gel permeation chromatography using polystyrene standards. The polymerispersity index (i.e., weight average molecular weight (Mw) divided by Mn) of the prepolymer is typically less than 2.0, e.g., less than 1.8 or less than 1.5.

With reference to general formulas V and VI, G may be a residue of a monomer selected from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_1$–$C_{20}$ alkyl (meth)acrylates; aromatic (meth)acrylates; polycyclicaromatic (meth)acrylates; vinyl esters of carboxylic acids; N,N-di(CI-Ce alkyl) (meth)acrylamides; maleimide; N—($C_1$–$C_{20}$ alkyl) maleimides; N—($C_3$–$C_8$ cycloalkyl) maleimides; N-(aryl) maleimides; and mixtures thereof. Examples of these monomers of which G may be a residue, include those as recited and described previously herein with regard to the hydrophobic polymer chain segments of the arms of the pigment dispersant.

With further reference to general formulas V and VI, E may have nonionic moieties, ionic moieties and combinations thereof. The hydrophilic residue E may be a residue of any of those monomers having nonionic moieties and/or ionic moieties as recited and described previously herein with regard to the hydrophilic polymer chain segments of the arms of the pigment dispersant, e.g., poly(alkylene glycol) (meth)acrylates, $C_1$–$C_4$ alkoxy poly(alkylene glycol) (meth)acrylates, salts of carboxylic acid functional monomers and salts of amine functional monomers. Hydrophilic residue E may have cationic moieties selected from ammonium, sulphonium and phosphonium, and may be a residue of any of those monomers having such moieties as discussed previously herein with regard to the hydrophilic polymer chain segments of the arms of the pigment dispersant, e.g., residues of glydicyl methacrylate reacted with thiodiethanol in the presence of lactic acid.

Each of G and E in general formulas V and VI may represent one or more types of monomer residues, while p and s represent the average total number of G and E residues occurring per block or segment of G residues (G-block or G-segment) and E residues (E-block or E-segment) respectively. When containing more than one type or species of monomer residue, the G- and E-blocks may each have at least one of random, block (e.g., di-block and tri-block), alternating and gradient architectures. Gradient architecture refers to a sequence of different monomer residues that changes gradually in a systematic and predictable manner along the polymer chain segment. For purposes of illustration, a G-block containing 6 residues of 2-ethylhexyl methacrylate (EHM) and 6 residues of an adduct of glycidyl methacrylate and p-nitrobenzoic acid (GNBA), for which p is 12, may have di-block, tetra-block, alternating and gradient architectures as represented in general formulas VII, VIII, IX and X.

Di-Block Architecture

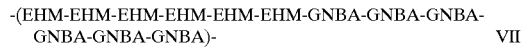        VII

Tetra-Block Architecture

        VIII

Alternating Architecture

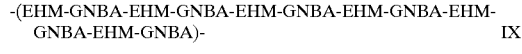        IX

Gradient Architecture

        X

The E-block may be described in a manner similar to that of the G-block.

The order in which monomer residues occur along a polymeric segment of the prepolymer is typically determined by the order in which the corresponding monomers are fed into the vessel in which the controlled radical polymerization is conducted. For example, the monomers that are incorporated as residues in the G-blocks of the prepolymer represented by general formula V are generally fed into the reaction vessel prior to those monomers that are incorporated as residues in the E-blocks.

During formation of the G- and E-blocks, if more than one monomer is fed into the reaction vessel at a time, the relative reactivities of the monomers typically determines the order in which they are incorporated into the living prepolymer. Gradient sequences of monomer residues within the G- and E-blocks can be prepared by controlled radical polymerization, and in particular by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937 at column 29, line 29 through column 31, line 35.

Subscripts p and s represent average numbers of residues occurring in the respective G and E blocks. Typically, subscripts p and s are each independently a number of at least 1, and preferably at least 3 for general formulas V and VI. Also, subscripts p and s may be each independently be a number of less than 100, preferably less than 80, and more preferably less than 50 (e.g., 20 or less) for general formulas V and VI. The value of subscripts p and s may each range independently between any combination of these values, inclusive of the recited values, e.g., p and s may each independently be a number from 1 to 100.

Symbol φ of general formulas V and VI is or is derived from the residue of the initiator used in the ATRP preparation of the prepolymer, and is free of the radically transferable group of the initiator. For example, when the prepolymer is initiated in the presence of benzyl bromide, the symbol φ,
more specifically φ-, is the benzyl residue,

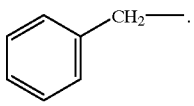

The symbol φ may also be derived from the residue of the initiator. For example, when the prepolymer is initiated using epichlorohydrin the symbol φ, more specifically φ-, is the 2,3-epoxy-propyl residue,

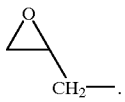

The 2,3-epoxypropyl residue can then be converted to, for example, a 3-(para-nitrobenzoate)-2-hydroxypropyl residue by reaction with para-nitrobenzoic acid.

When prepared by ATRP, the pigment dispersant will contain residues of or derived from radically transferable groups, for example, as represented by the letter T in pigment dispersants 2, 3, 4 and 6 of FIGS. 1–4 of the drawings. The residue of the radically transferable group may be (a) left on the pigment dispersant, (b) removed or (c) chemically converted to another moiety. The radically transferable group may be removed by substitution with a nucleophilic compound, e.g., an alkali metal alkoxylate. When the residue of the radically transferable group is, for example, a cyano group (—CN), it can be converted to an amide group or carboxylic acid group by methods known in the art.

In a preferred embodiment of the present invention, the radically transferable group is a halide, which can be removed from the pigment dispersant by means of a mild dehalogenation reaction. The reaction is typically performed as a post-reaction after the pigment dispersant has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen containing pigment dispersant with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound).

Not intending to be bound by any theory, it is believed, based on the evidence at hand, that the reaction between the halogen containing pigment dispersant and one or more LRPEU compounds results in (1) removal of the halogen group, and (2) the addition of at least one carbon-carbon double bond where the carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of halogen present in the pigment dispersant. When added in excess of a stoichiometric amount, the LRPEU compound is typically present in an amount of no greater than 5 mole percent, e.g., 1 to 3 mole percent, in excess of the total moles of halogen.

Limited radically polymerizable ethylenically unsaturated compounds useful for dehalogenating the pigment dispersant under mild conditions include those represented by the following general formula XI.

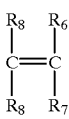

XI

In general formula XI, $R_6$ and $R_7$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_6$ and $R_7$ groups is an organo group while the other can be an organo group or hydrogen. For instance when one of $R_6$ or $R_7$ is an alkyl group, the other can be an alkyl, aryl, acyloxy, alkoxy, arenes, sulfur-containing alkyl group, or nitrogen-containing alkyl and/or nitrogen-containing aryl groups. The $R_8$ groups can be the same or different groups selected from hydrogen or lower alkyl selected such that the reaction between the terminal halogen of the pigment dispersant and the LRPEU compound is not prevented. Also an $R_8$ group can be joined to the $R_6$ and/or the $R_7$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between the halogen containing pigment dispersant and an LRPEU compound, e.g., alpha-methyl styrene, is summarized in the following general scheme 1.

General Scheme 1

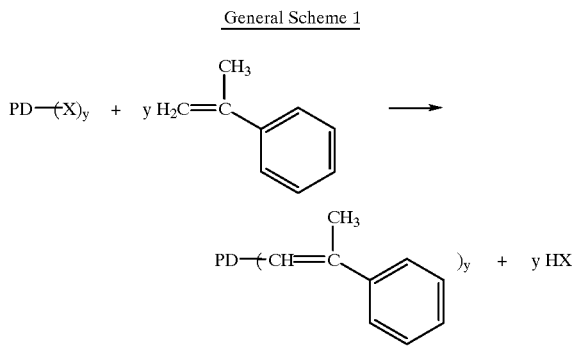

In general scheme 1, PD-(X)$_y$ represents the halogen containing pigment dispersant, and y is the number of halogens on the pigment dispersant.

The pigment dispersant used in the pigment dispersions of the present invention, typically has a number average molecular weight of from 3000 to 1,000,000, e.g., from 2000 to 100,000 or from 3000 to 30,000. The polydispersity index[]of the pigment dispersant is typically from 1.1 to 14, e.g., from 2 to 8. Polymers prepared by controlled radical polymerization methods, such as ATRP, may have polydispersity index values (PDI's) of less than 2.0. However, due in part to the use of polyfunctional monomers, the pigment dispersants of the pigment dispersions of the present invention typically have PDI's in excess of 2.0.

The pigment dispersant (c) is typically present in the pigment dispersion of the present invention in an amount of at least 0.1 percent by weight, preferably at least 0.5 percent by weight, and more preferably at least 1 percent by weight, based on the total weight of the pigment dispersion. The pigment dispersant is also typically present in the pigment dispersion in an amount of less than 65 percent by weight, preferably less than 40 percent by weight, and more preferably less than 25 percent by weight, based on the total weight of the pigment dispersion. The amount of pigment dispersant (c) present in the pigment dispersion of the present invention may range between any combination of these values, inclusive of the recited values.

The pigment of the pigment dispersion of the present invention may be selected from inorganic pigments, such as carbon black pigments, e.g., furnace blacks, electrically conductive carbon black pigments, extender pigments and corrosion inhibitive pigments; organic pigments; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxide, yellow iron oxide, black iron oxide and transparent iron oxides. Extender pigments that may be present in the pigment dispersion include, but are not limited to, silicas, clays, and alkaline earth metal sulfates, such as calcium sulfate and barium sulfate. The pigment dispersion may contain corrosion inhibitive pigments, such as aluminum phosphate and calcium modified silica.

The pigment (a) is typically present in the pigment dispersion of the present invention in an amount of at least 0.5 percent by weight, preferably at least 5 percent by weight, and more preferably at least 20 percent by weight, based on the total weight of the pigment dispersion. The pigment is also typically present in the pigment dispersion in an amount of less than 90 percent by weight, preferably less than 80 percent by weight, and more preferably less than 75 percent by weight, based on the total weight of the pigment dispersion. The amount of pigment present in the pigment dispersion may range between any combination of these values, inclusive of the recited values.

The pigment (a) and pigment dispersant (c) are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the pigment and pigment dispersant. The weight ratio of pigment (a) to pigment dispersant (c) is typically from 0.1:1 to 100:1, e.g., from 0.2:1 to 5:1 or from 0.5:1 to 2:1.

The pigment dispersion of the present invention also comprises an aqueous carrier selected from water and a mixture of water and at least one organic solvent (preferably a water soluble organic solvent). Classes of organic solvents that may be present in the aqueous carrier include, but are not limited to, alcohols, e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, e.g., butyl 2-hydroxyethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds such as thioglycol, dimethyl sulfoxide and tetramethylene sulfone.

When the aqueous carrier comprises a mixture of water and organic solvent, the aqueous carrier typically contains from 30 to 95 percent by weight of water, and from 5 to 70 percent by weight of organic solvent, e.g., from 60 to 95 percent by weight of water, and from 5 to 40 percent by weight of organic solvent. The percent weights are based on the total weight of the aqueous carrier.

The aqueous carrier (b) is typically present in the pigment dispersion of the present invention, in an amount of at least 5 percent by weight, preferably at least 15 percent by weight, and more preferably at least 30 percent by weight, based on the total weight of the pigment dispersion. The aqueous carrier is also typically present in the pigment dispersion in an amount of less than 99.4 percent by weight, preferably less than 80 percent by weight, and more preferably less than 60 percent by weight, based on the total weight of the pigment dispersion. The amount of aqueous carrier present in the pigment dispersion may range between any combination of these values, inclusive of the recited values.

The pigment dispersion may be prepared by methods that are known to those of ordinary skill in the art. Such known methods typically involve the use of energy intensive mixing or grinding means, such as ball mills or media mills (e.g., sand mills), as described previously herein.

The pigment dispersion of the present invention is useful in the preparation of, for example, coatings compositions and inks. To form a pigmented coating composition, the pigment dispersion is typically mixed together with resins, crosslinkers, additives, such as flow control agents, and additional solvents. Coating compositions into which the pigment dispersion of the present invention may be incorporated include, for example, liquid spray-, dip- and curtain-applied primer, basecoat (i.e., the basecoat in a color-plus-clear basecoat/clearcoat system) and topcoat compositions, and electrodepositable coating compositions.

The present invention is more particularly described in the following examples, which are intended to be illustrative only, since numerous modifications and variations therein will be apparent to those skilled in the art. Unless otherwise specified, all parts and percentages are by weight.

Synthesis Examples A–D

Synthesis Examples A and B, and C and D describe the preparation of two pigment dispersants that are used to prepare pigment dispersions according to the present invention as described in the pigment dispersion Examples.

Example A

A pigment dispersant precursor was prepared by controlled radical polymerization from the ingredients as enumerated in the following Table A. The pigment dispersant precursor of Example A was modified to form a pigment dispersant useful in the pigment dispersions of the present invention, as described in Example B.

TABLE A

| Ingredients | Parts by weight |
|---|---|
| Charge 1 | |
| toluene | 200 |
| copper powder (a) | 2.5 |
| 2,2'-bipyridyl | 4.4 |
| p-toluenesulfonyl chloride | 38 |
| glycidyl methacrylate | 114 |
| Charge 2 | |
| toluene | 200 |
| MPEG 550 MA monomer (b) | 972 |
| methyl 2-hydroxypropyl ether | 175 |
| Charge 3 | |
| toluene | 400 |
| Bisphenol A ethoxylate dimethacrylate (c) | 76 |

(a) The copper powder had an average particle size of 25 microns, a density of 1 gram/cm$^3$, and was obtained commercially from OMG Americas.
(b) MPEG 550 MA monomer is a methoxy poly(ethylene glycol) methacrylate monomer from Sartomer Company, Inc.
(c) Bisphenol A ethoxylate (2 EO/phenol) dimethacrylate obtained from Aldrich Chemical Company, catalogue number 41, 211–2, Chemical Abstracts Service Registry Number 41637-38-1.

Charge 1 was added to a 2 liter 4-necked flask equipped with a motor driven stainless steel stir blade, water cooled condenser, and a heating mantle and thermometer connected through a temperature feed-back control device. A dry nitrogen sweep was passed through the flask throughout the course of the polymerization. The contents of the reaction vessel were heated with agitation to and held at 80° C. for 1.5 hours. Charge 2 was then added over a period of 15 minutes, followed by a four hour hold at 80° C. Charge 3 was added over a period of 15 minutes, followed by a two hour hold at 80° C. The reaction mixture was cooled and passed through a filter-press packed with MAGNESOL synthetic magnesium silicate (obtained from The Dallas Group of America). The resultant block copolymer had a total solids content of 60 percent by weight, based on total weight, as determined at 110° C. for one hour. The solvent was removed by vacuum stripping, and the polymer had dissolved in butyl carbitol at a total weight solids content of 59 percent by weight, as determined at 110° C. for one hour.

The polymer had a number average molecular weight $(M_n)=2367$, a weight average molecular weight $(M_w)$ of 16,570, and polydispersity $(M_w/M_n)=7$ (determined by gel permeation chromatography using polystyrene as a standards).

Example B

A pigment dispersant useful in the pigment dispersions of the present invention was prepared from the precursor of Example A using the ingredients as enumerated in Table B.

TABLE B

| Ingredients | Parts by weight |
|---|---|
| pigment dispersant precursor of Example A (d) | 2000 |
| para-nitrobenzoic acid | 132 |
| ethyltriphenylphosphonium iodide catalyst | 1.2 |

(d) Having a resin solids content of 59 percent by weight, based on total weight.

The ingredients listed in Table B were added to a 3 liter round bottom flask equipped with a motor driven stainless steel stir blade, water cooled reflux condenser, and a heating mantle and thermometer connected through a temperature feed-back control device. The contents of the flask were heated to and held at 100° C. for 7 hours. Upon cooling to room temperature, the contents of the flask were mixed with deionized water to form an aqueous composition having a resin solids content of 22 percent by weight, based on total weight.

Example C

A pigment dispersant precursor was prepared by controlled radical polymerization from the ingredients as enumerated in the following Table C. The pigment dispersant precursor of Example C was modified to form a pigment dispersant useful in the pigment dispersions of the present invention, as described in Example D.

TABLE C

| Ingredients | Parts by weight |
|---|---|
| Charge 1 | |
| toluene | 400 |
| copper powder (a) | 2.5 |
| 2,2'-bipyridyl | 4.4 |

TABLE C-continued

| Ingredients | Parts by weight |
| --- | --- |
| p-toluenesulfonyl chloride | 38 |
| Bisphenol A ethoxylate dimethacrylate (c) | 76 |
| Charge 2 | |
| toluene | 200 |
| MPEG 550 MA monomer (b) | 972 |
| methyl 2-hydroxypropyl ether | 175 |
| Charge 3 | |
| toluene | 200 |
| glycidyl methacrylate | 114 |

Charge 1 was added to a 2 liter 4-necked flask equipped similarly as described in Example A. A dry nitrogen sweep was passed through the flask throughout the course of the polymerization. The contents of the reaction vessel were heated with agitation to and held at 80° C. for 1.5 hours. Charge 2 was then added over a period of 15 minutes, followed by a four hour hold at 85° C. Charge 3 was added over a period of 15 minutes, followed by a four hour hold at 80° C. The reaction mixture was cooled and passed through a filter-press packed with MAGNESOL synthetic magnesium silicate (obtained from The Dallas Group of America). The resultant block copolymer had a total solid content of 60 percent by weight, based on total weight, as determined at 110° C. for one hour. The solvent was removed by vacuum stripping, and the polymer was dissolved in butyl carbitol at a total weight solids content of 59 percent by weight, as determined at 110° C. for one hour.

The polymer had a number average molecular weight $(M_n)$=6708, a weight average molecular weight (Mw) of 16,770, and polydispersity $(M_w/M_n)$=2.5 (determined by gel permeation chromatography using polystyrene as a standards).

Example D

A pigment dispersant useful in the pigment dispersions of the present invention was prepared from the precursor of Example C using the ingredients as enumerated in Table D.

TABLE D

| Ingredients | Parts by weight |
| --- | --- |
| pigment dispersant precursor of Example C (e) | 2000 |
| para-nitrobenzoic acid | 132 |
| ethyltriphenylphosphonium iodide catalyst | 1.2 |

(e) Having a resin solids content of 59 percent by weight, based on total weight.

The ingredients listed in Table D were added to a 3 liter round bottom flask equipped similarly as described in Example B. The contents of the flask were heated to and held at 100° C. for 7 hours. Upon cooling to room temperature, the contents of the flask were mixed with deionized water to form an aqueous composition having a resin solids content of 38.5 percent by weight, based on total weight.

Pigment Dispersion Examples 1 and 2

Pigment dispersions according to the present invention, were prepared using the ingredients listed in Table 1. Physical properties of the pigment dispersions are listed in Table 2.

TABLE 1

| | Pigment Dispersions | |
| --- | --- | --- |
| Ingredients | Pigment Dispersion 1 | Pigment Dispersion 2 |
| pigment dispersant of Example B | 215 | 0 |
| pigment dispersant of Example D | 0 | 272 |
| defoamer (f) | 1.6 | 5.9 |
| butyl cellosolve | 80 | 34 |
| methyl 2-hydroxypropyl ether | 0 | 14.8 |
| chlorinated copper phthalocyanine blue pigment (g) | 24 | 47 |
| aqueous DMEA (h) | 6.1 | 6.8 |

(f) BYK 031 defoamer from Byk-Chemie.
(g) B-4816 Palomar Blue chlorinated copper phthalocyanine blue pigment obtained from Bayer.
(h) 50 percent by weight dimethylethanolamine (DMEA) in deionized water.

Pigment dispersions 1 and 2 were each prepared according to the following method. Pigment dispersant, defoamer and deionized water were mixed in a stainless steal beaker using a cowles blade for approximately 10 minutes. The chlorinated copper phthalocyanine blue pigment was added to the stainless steal beaker with agitation from the cowles blade. The pH of the contents of the stainless steal beaker was adjusted to a value of 9 by addition of the aqueous dimethylethanolamine, followed by 15 minutes of additional mixing with the cowles blade to form a pre-paste. The pre-paste was then transferred to and ground in an Eiger Mini Motormill 100 (from Eiger Machine, Inc. of Chicago, Ill.). During the grinding process, the temperature of the contents of mill did not rise above 30° C. The pigment dispersion was removed from the mill and transferred to a suitable container.

TABLE 2

| | Physical Properties of Pigment Dispersions 1 and 2 | |
| --- | --- | --- |
| | Pigment Dispersion 1 | Pigment Dispersion 2 |
| Percent Solids (i) | 22 | 41 |
| Pigment to Pigment Dispersant Ratio (j) | 0.5 | 0.5 |
| Haze Value (%) (k) | 4.6 | 12.6 |
| Mean Particle Size (microns) (l) | 0.881 | 0.902 |

(i) Percent solids by weight, based on the total weight of the pigment dispersion.
(j) The weight of dry pigment divided by the solids weight of pigment dispersant.
(k) Haze values were determined using a TCS Plus Spectrophotometer Model 8870 from Byk-Gardner.
(l) Particle size was determined using a Coulter LS 230 Particle Size Analyzer from Beckman Coulter Corporation.

Mean particle sizes of less than 2 microns and haze values of less than 25 percent are considered generally to be desirable for aqueous pigment dispersions of chlorinated copper phthalocyanine blue pigment having a pigment to pigment dispersant weight ratio of 0.5, and a solids content in the range of 20 to 45 percent by weight, based on total weight.

The present invention has been described with reference to specific details of particular embodiments thereof. It is not intended that such details be regarded as limitations upon the scope of the invention except insofar as and to the extent that they are included in the accompanying claims.

We claim:

1. A pigment dispersion comprising:

(a) pigment;

(b) an aqueous carrier selected from water and a mixture of water and at least one organic solvent; and (c) at least one pigment dispersant prepared by atom transfer radical polymerization of a polymerizable composition selected from, (i) a prepolymer having a radically transferable group, and a polyfunctional monomer having at least two radically polymerizable ethylenically unsaturated groups, said prepolymer being prepared by atom transfer radical polymerization of at least one first monomer having a single radically polymerizable ethylenically unsaturated group in the presence of a monomeric initiator having at least one radically transferable group selected from the group consisting of linear aliphatic compounds, branched aliphatic compounds cycloaliphatic compounds, aromatic compounds, polycyclic aromatic compounds, heterocyclic compounds, sulfonyl compounds, sulfenyl compounds, esters of carboxylic acids, nitriles, ketones and mixtures thereof;

(ii) a star polymer having a plurality of radically transferable groups, and at least one second monomer having a single radically polymerizable ethylenically unsaturated group, said star polymer being prepared by the atom transfer radical polymerization of said prepolymer and said polyfunctional monomer, said first and second monomers being the same or different;

(iii) a core initiator having a plurality of radically transferable groups, and said first monomer, said core initiator being prepared by atom transfer radical polymerization of said polyfunctional monomer in the presence of said monomeric initiator; and (iv) said first monomer and said polyfunctional monomer in the presence of said monomeric initiator;

wherein upon the atom transfer radical polymerization of said polymerizable compositions said polyfunctional monomer or said core initiator forms substantially a core segment of said pigment dispersant, and said prepolymer or at least one of said first and second monomers forms substantially a plurality of arm segments of said pigment dispersant, each of said arm segments having hydrophobic and hydrophilic polymer chain segments, said monomeric initiator being part of said hydrophobic segment.

2. The pigment dispersion of claim 1 wherein said monomeric initiator has a single radically transferable group which is a halide, and said monomeric initiator is selected from the group consisting of 1-halo-2,3-epoxypropane, p-toluenesulfonyl halide, p-toluenesulfenyl halide, $C_6$–$C_{20}$-alkyl ester of alpha-halo-$C_2$–$C_6$-carboxylic acid, halomethylbenzene, (1-haloethyl)benzene, halomethylnaphthalene, halomethylanthracene and mixtures thereof.

3. The pigment dispersion of claim 1 wherein the radically polymerizable ethylenically unsaturated groups of said polyfunctional monomer are (meth)acryloyl groups.

4. The pigment dispersion of claim 3 wherein said polyfunctional monomer is represented by the following general formula,

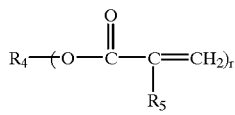

wherein $R_4$ is a residue of a polyol having at least two hydroxyl groups, $R_5$ is hydrogen or methyl, and r is a number from 2 to a number equal to the number of hydroxy groups of said polyol.

5. The pigment dispersant of claim 4 wherein said polyol is selected from alkylene glycol, poly(alkylene glycol), 4,4'-isopropylidenediphenol, trimethylol ethane, trimethylol propane, pentaerythritol, di-trimethylol ethane, di-trimethylol propane, di-pentaerythritol and mixtures thereof.

6. The pigment dispersion of claim 1 wherein said first and second monomers are each selected independently from vinyl monomers, allylic monomers, olefins and mixtures thereof.

7. The pigment dispersion of claim 6 wherein the hydrophobic polymer chain segments of each arm contain residues of a monomer selected from the group consisting of: oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_1$–$C_{20}$ alkyl (meth)acrylates; aromatic (meth) acrylates; polycyclicaromatic (meth)acrylates; vinyl esters of carboxylic acids; N,N-di($C_1$–$C_8$ alkyl) (meth) acrylamides; maleimide; N—($C_1$–$C_{20}$ alkyl) maleimides; N—($C_3$–$C_8$ cycloalkyl) maleimides; N-(aryl) maleimides; and mixtures thereof.

8. The pigment dispersion of claim 7 wherein said oxirane functional monomer is selected from the group consisting of glycidyl (meth)acrylate, 3,4-epoxycyclohexylmethyl(meth) acrylate, 2-(3,4-epoxycyclohexyl)ethyl(meth)acrylate, allyl glycidyl ether and mixtures thereof; and said carboxylic acid is selected from the group consisting of para-nitrobenzoic acid, hexanoic acid, 2-ethyl hexanoic acid, decanoic acid, undecanoic acid and mixtures thereof.

9. The pigment dispersion of claim 6 wherein the hydrophilic polymer chain segments of said arms contain monomer residues having nonionic moieties, ionic moieties and combinations thereof.

10. The pigment dispersion of claim 9 wherein the hydrophilic polymer chain segments of said arms contain residues of monomers selected from the group consisting of poly (alkylene glycol) (meth)acrylates, $C_1$–$C_4$ alkoxy poly (alkylene glycol) (meth)acrylates, hydroxyalkyl (meth) acrylates having from 2 to 4 carbon atoms in the alkyl group, N-(hydroxy $C_1$–$C_4$ alkyl) (meth)acrylamides, N,N-di-(hydroxy $C_1$–$C_4$ alkyl) (meth)acrylamides, carboxylic acid functional monomers, salts of carboxylic acid functional monomers, amine functional monomers, salts of amine functional monomers and mixtures thereof.

11. The pigment dispersion of claim 10 wherein the carboxylic acid functional monomers are selected from the group consisting of (meth)acrylic acid, maleic anhydride, maleic acid and mixtures thereof; and the amine functional monomers are selected from the group consisting of amino ($C_2$–$C_4$ alkyl) (meth)acrylates, N—($C_1$–$C_4$ alkyl)amino ($C_2$–$C_4$ alkyl) (meth)acrylates, N,N-di($C_1$–$C_4$ alkyl)amino ($C_2$–$C_4$ alkyl) (meth)acrylates and mixtures thereof.

12. The pigment dispersion of claim 9 wherein the hydrophilic polymer chain segments of said arms contain monomer residues having moieties selected from ammonium, sulphonium and phosphonium.

13. The pigment dispersion of claim 1 wherein the hydrophilic polymer chain segment of said arm segment of said pigment dispersant has a calculated average value of 100× (oxygen weight+nitrogen weight)/carbon weight of from 55 to 133; and the hydrophobic polymer chain segment of said arm segment of said pigment dispersant has a calculated average value of 100×(oxygen weight+nitrogen weight)/carbon weight of from 10 to less than 55.

14. The pigment dispersion of claim 1 wherein said prepolymer has the following polymer chain structure,

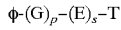

wherein G is a hydrophobic residue of at least one radically polymerizable ethylenically unsaturated monomer: E is a hydrophilic residue of at least one radically polymerizable ethylenically unsaturated monomer; φ is a residue of or derived from said monomeric initiator, and is free of said radically transferable group; T is said radically transferable group; p and s represent average numbers of residues occurring in a block of residues, and are each individually selected for each structure such that said prepolymer has a number average molecular weight of at least 250.

15. The pigment dispersion of claim 14 wherein G is a residue of a monomer selected from to-e group consisting of: oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_1$–$C_{20}$ alkyl (meth)acrylates; aromatic (meth)acrylates; polycyclicaromatic (meth)acrylates; vinyl esters of carboxylic acids; N,N-di($C_1$–$C_8$ alkyl) (meth)acrylamides; maleimide; N—($C_1$–$C_{20}$ alkyl) maleimides; N—($C_3$–$C_8$ cycloalkyl) maleimides; N-(aryl) maleimides; and mixtures thereof.

16. The pigment dispersion of claim 14 wherein E has nonionic moieties, ionic moieties and combinations thereof.

17. The pigment dispersion of claim 16 wherein E is a residue of a monomer selected from the group consisting of poly(alkylene glycol) (meth)acrylates, $C_1$–$C_4$ alkoxy poly (alkylene glycol) (meth)acrylates, hydroxyalkyl (meth) acrylates having from 2 to 4 carbon atoms in the alkyl group, N-(hydroxy $C_1$–$C_4$ alkyl) (meth)acrylamides, N,N-di-(hydroxy $C_1$–$C_4$ alkyl) (meth)acrylamides, carboxylic acid functional monomers, salts of carboxylic acid functional monomers, amine functional monomers, salts of amine functional monomers and mixtures thereof.

18. The pigment dispersion of claim 16 wherein E has cationic moieties selected from ammonium, sulphonium and phosphonium.

19. The pigment dispersion of claim 14 wherein p and s are each independently for each structure a number from 1 to 100, and said prepolymer has a polydispersity of less than 2.0.

20. The pigment dispersion of claim 1 wherein the radically transferable group of said monomeric initiator is a halide, and said pigment dispersant contains residues derived from a dehalogenation post-reaction.

21. The pigment dispersion of claim 20 wherein said dehalogenation post-reaction comprises contacting said polymeric dispersant with a limited radically polymerizable ethylenically unsaturated compound.

22. The pigment dispersion of claim 21 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

23. The pigment dispersion of claim 1 wherein pigment (a) is selected from inorganic pigments, organic pigments and mixtures thereof.

24. The pigment dispersion of claim 1 wherein pigment (a) and said pigment dispersant (c) are together present in an amount of from 20 percent by weight to 80 percent by weight, based the total weight of said pigment dispersion.

25. The pigment dispersion of claim 24 wherein the weight ratio of pigment (a) to said pigment dispersant (c) is from 0.1:1 to 100:1.

26. The pigment dispersion of claim 1 wherein pigment (a) is present in an amount of from 0.5 percent to 90 percent by weight, based on total weight of said pigment dispersion, said aqueous carrier (b) is present in an amount of from 5 percent to 99.4 percent by weight, based on total weight of said pigment dispersion, and said pigment dispersant (c) is present in an amount of from 0.1 percent to 65 percent by weight, based on total weight of said pigment dispersion.

* * * * *

UNITED STATES PATENT AND TRADEMARK OFFICE
CERTIFICATE OF CORRECTION

PATENT NO. : 6,336,966 B1
DATED : January 8, 2002
INVENTOR(S) : Coca et al.

It is certified that error appears in the above-identified patent and that said Letters Patent is hereby corrected as shown below:

Column 23,
Line 23, after the word "compounds" in the first instance, insert a comma (,);
Line 26, delete "nitrites" and insert -- nitriles --; and
Line 44, delete the word "compositions" and insert -- composition --.

Column 25,
Line 16, after "monomer", delete the colon (:) and replace it with a semi-colon (;).

Signed and Sealed this

Second Day of July, 2002

Attest:

Attesting Officer

JAMES E. ROGAN
Director of the United States Patent and Trademark Office